United States Patent [19]

Kowalik et al.

[11] Patent Number: 4,829,436
[45] Date of Patent: May 9, 1989

[54] VEHICLE AIR SUSPENSION SYSTEM WITH ACCURATE SIDE TO SIDE LEVELING

[75] Inventors: James J. Kowalik, West Carlton; Kamal N. Majeed, Kettering, both of Ohio

[73] Assignee: General Motors Corporation, Detroit, Mich.

[21] Appl. No.: 66,966

[22] Filed: Jun. 29, 1987

[51] Int. Cl.$^4$ .............................................. B60G 17/00
[52] U.S. Cl. ................................ 364/424.05; 280/707; 280/840
[58] Field of Search .................... 364/424.05; 280/6 R, 280/6.1, 6.11, 707; 267/64.16

[56] References Cited

U.S. PATENT DOCUMENTS

| | | | |
|---|---|---|---|
| 4,105,216 | 8/1978 | Graham et al. | 280/6 R |
| 4,453,725 | 6/1984 | Kuwana et al. | 280/6 R |
| 4,466,625 | 8/1987 | Kondo et al. | 280/6 R |
| 4,593,920 | 6/1986 | Natsume et al. | 280/6 R |
| 4,685,689 | 8/1987 | Takizawa et al. | 280/707 |

Primary Examiner—Gary Chin
Attorney, Agent, or Firm—Robert M. Sigler

[57] ABSTRACT

A vehicle suspension system has at least one leveling device with a leveling sensor on each side of the vehicle. Leveling action is initiated when a sensor indicates height out of a dead band around the calibrated level for the sensor. Once initiated, leveling action occurs independently for all devices in closed loop to target levels, different for intake and exhaust, which allow overshoot to a common intermediate level, the intermediate level allowing settling to the calibrated level. Order of leveling is rear first with intake before exhaust and then front with exhaust before intake to prevent the rear from falling below the front. Leveling is prevented when the vehicle is not moving but has moved since the last opening of one or more selected vehicle doors.

3 Claims, 4 Drawing Sheets

VEHICLE AIR SUSPENSION SYSTEM WITH ACCURATE SIDE TO SIDE LEVELING

BACKGROUND OF THE INVENTION

This invention relates to vehicle leveling systems of the type which automatically respond to one or more level sensors to maintain a predetermined level of the sprung mass of the vehicle relative to the unsprung road wheels as the loads on various portions of the vehicle change.

Although such vehicle leveling systems have been known for some time and the prior art is crowded with devices and controls, there has been little attention paid to the side to side leveling of the vehicle under static conditions. Such leveling is controllable by systems of the three or four corner variety, wherein at one or both ends of the vehicle the levels of the sides are independently adjustable.

Side to side leveling is important primarily for appearance purposes. Most vehicles have a shorter distance from side to side between wheels than from front axle to rear axle. Thus, differences in level from side to side produce a slightly greater slant in the vehicle body relative to the ground than the same differences from front to rear. In addition, the shape of most vehicles when viewed from the front or back, and especially the low, straight bumper line, appears to accentuate slight differences in level between the sides of the vehicle that would not be apparent in front to back level when viewed from the side of the vehicle. Finally, people are more inclined to accept differences in level between front and rear as opposed to such differences from side to side, since the former may be viewed as a positive design feature such as a "rake" for streamlining while the latter is generally not so construed. Therefore, even though there is actually nothing wrong with a vehicle that may have an inch or so difference in side to side level, it is desirable to reduce this difference when possible to produce a quality appearance for customer satisfaction. This calls for a leveling system with more accuracy than prior art systems have shown.

On the other hand, it is not desirable for the level system to be continually cycling as it responds to every tiny difference in level at each corner. The sound of the compressor and other fluid components can be annoying, especially when the vehicle is stationary so that there is no masking of the sound by other, more expected sounds. To avoid this, leveling systems generally use dead bands and/or hysteresis in responding to the height sensor signals. Once again, the issue is customer satisfaction; and the two somewhat conflicting concerns must be reconciled.

SUMMARY OF THE INVENTION

The suspension system of this invention greatly reduces the problem in a way that causes leveling to proceed to a more accurate degree sufficient to produce level appearance from side to side while retaining the advantages of dead band and/or hysteresis in reducing the annoyance of system operation.

It is of the type having a fluid pressure operated leveling device and level sensor on each side of the vehicle and control apparatus comprising intake means responsive to a low signal from one of the sensors to increase the pressure fluid to the associated leveling device and thus raise the level of the sprung mass adjacent the associated road wheel and exhaust means responsive to a high signal from one of the sensors to decrease the pressure fluid to the associated leveling device and thus lower the level of the sprung mass adjacent the associated road wheel.

It comprises control means effective to control the response of the intake and exhaust means to the signals from the sensors to initiate leveling activity in closed loop operation for all devices as required to individual target levels when a sensor indicates one of the devices outside a dead band and discontinue leveling activity when all sensors have indicated that the target levels have been reached.

It further comprises first memory means for each of said leveling devices storing a calibrated level, an upper trim level above the calibrated level and a lower trim level below the calibrated level for that leveling device, the upper and lower trim levels defining the dead band for that leveling device and second memory means for each of said leveling devices storing an intake trim level between the calibrated level and the upper trim level and an exhaust trim level between the intake trim level and the upper trim level. The intake trim level is the target level for intake leveling activity, and the exhaust trim level is the target level for exhaust leveling activity, the intake and exhaust trim levels being set to provide for overshoot during intake and exhaust, respectively, to a common intermediate level therebetween. The common intermediate level is set to provide for settling to the calibrated level after leveling activity is discontinued.

The result of the suspension system of the invention is that, leveling action is initiated only when a corner is out of the dead band but once initiated, it continues until target levels are reached by all corners with great accuracy, including allowance for overshoot and settling. Once the accurate level is obtained, the dead band prevents a new initiation of leveling until a corner once again goes significantly out of level. Further details and advantages of the invention will be apparent from the accompanying drawings and following description of a preferred embodiment.

DESCRIPTION OF THE PREFERRED EMBODIMENT

Figure 1:
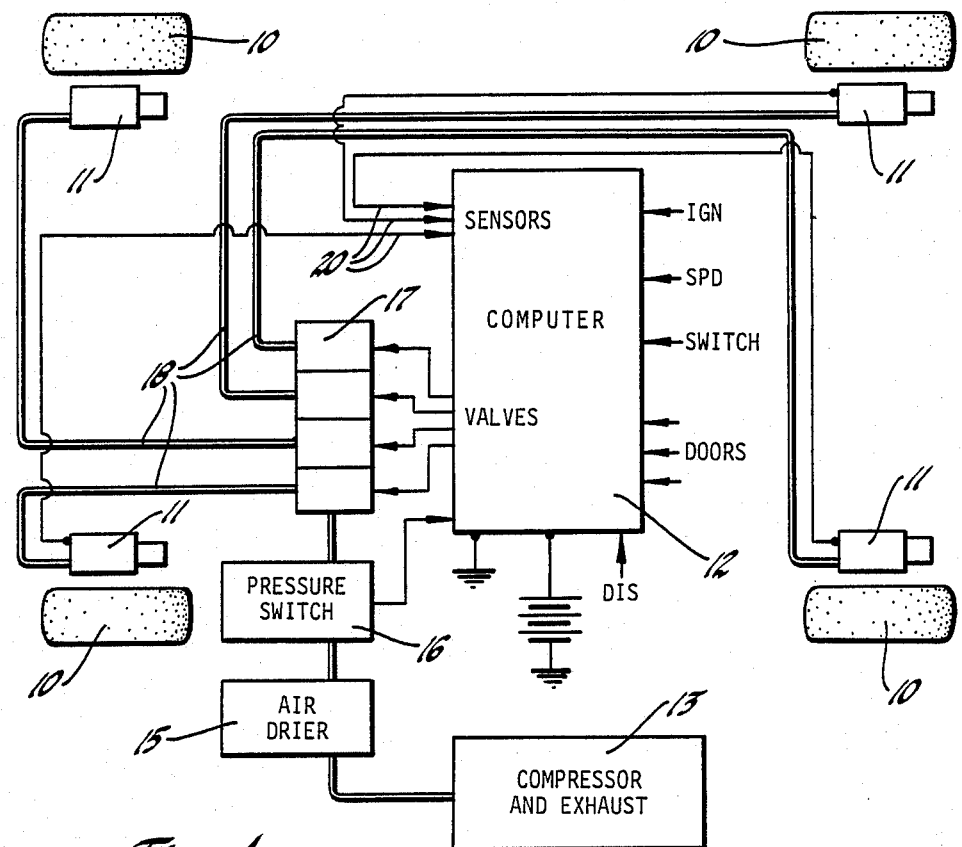
FIG. 1 is a schematic diagram of a vehicle with a suspension system according to the invention.

Referring to FIG. 1, a motor vehicle is represented by four road wheels 10, one at each corner of the vehicle. Associated with each road wheel 10 is a leveling device 11. Leveling device 11 may be an air spring or similar device or an air controlled shock absorber. It may particularly be a combination air spring and shock absorber such as shown in U.S. Pat. No. 4,635,909, issued to Henning Gold on Jan. 13, 1987, or U.S. Ser. No. 896,452 of Michael J. McClain et al, filed Aug. 13, 1986. In any case, each such device is responsive to a pressure fluid supplied thereto or exhausted therefrom to raise or lower, respectively, the adjacent portion of the sprung mass of the vehicle.

Each leveling device 11 includes a level position sensor with the capability of generating a continuous analog or high resolution digital level position signal. The outputs of these sensors are provided to a control computer 12. Computer 12 also receives and IGN signal from the vehicle ignition switch, a vehicle speed signal SPD, a disable signal DIS, door switch signals from selected vehicle doors and may include an operator control switch input for operator selection of level, such as higher level for off road operation or lower level for high speed operation. A compressor/exhaust apparatus 13 selectively provides or vents a pressurized fluid such as air through an air drier 15 and pressure switch 16 which also has a signal output to computer 12. The air line runs from pressure switch 16 to a control valve assembly 17 which controls the communication of compressor/exhaust apparatus 13 with the individual leveling devices in response to signals from computer 12. An air line 18 runs from each valve of assembly 17 to one of the leveling devices. Signal lines 20 run from the sensors in three of the four leveling devices to computer 12. Pressure switch 16 provides a signal to computer 12 when the pressure to any leveling device falls below 35 psi to automatically provide air to that leveling device. This is especially important after service in which an air spring leveling device is removed and reinstalled. The repressurization of the device is accomplished automatically.

Figure 2:
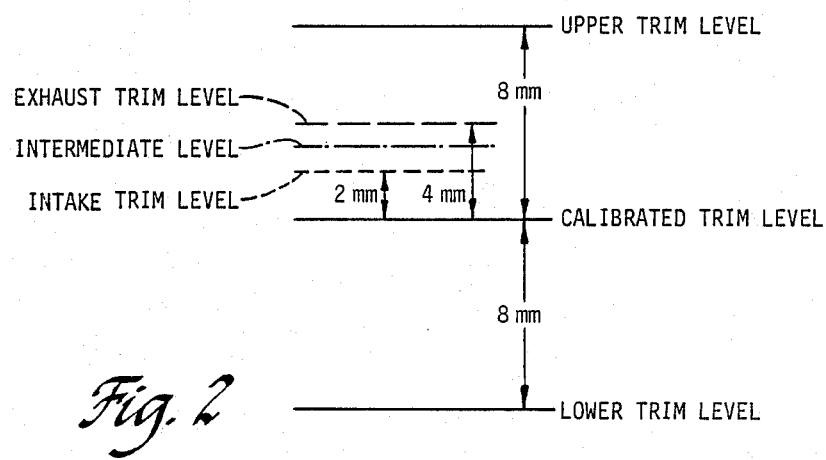
FIGS. 2 defines various levels of a single leveling device and sensor.

The leveling operation of the system will now be described, with reference to FIGS. 2 and 3. Referring to FIG. 2, a calibrated trim for each sensor is stored in the memory of computer 12. This may be accomplished during the manufacturing process by physically leveling the vehicle and causing each sensor to be read, with the resulting readings stored in non-volatile EEPROM. From each calibrated trim value, upper and lower trim levels may be determined by adding and subtracting a predetermined number. In the case shown in FIG. 2, the upper and lower trim levels are 8 mm above and below the calibrated trim level. The upper and lower trim levels establish the dead band, with no leveling action initiated unless a sensor is out of its particular dead band.

Still referring to FIG. 2, an intake trim level is established 2 mm above the calibrated trim level; and an exhaust trim level is established 4 mm above the calibrated trim level. The latter is above the former, and both are between the calibrated trim level and the upper trim level. Once a leveling operation is initiated, the intake or exhaust trim level will be used as the target level in closed loop control for each leveling device until it is achieved. The intake trim level is used for intake or compression leveling activity requiring raising a corner of the vehicle; and the exhaust trim level is used for exhaust leveling activity required lower a corner of the vehicle. Once leveling activity is initiated, the upper and lower trim bands will be ignored and all devices activated as required to their individual target levels. Regardless of which direction leveling activity is moving for a particular leveling device, the system will coast or overshoot the target level to a common intermediate level; and the system will gradually settle after leveling activity is complete from the common intermediate level to the calibrated level.

Figure 3:
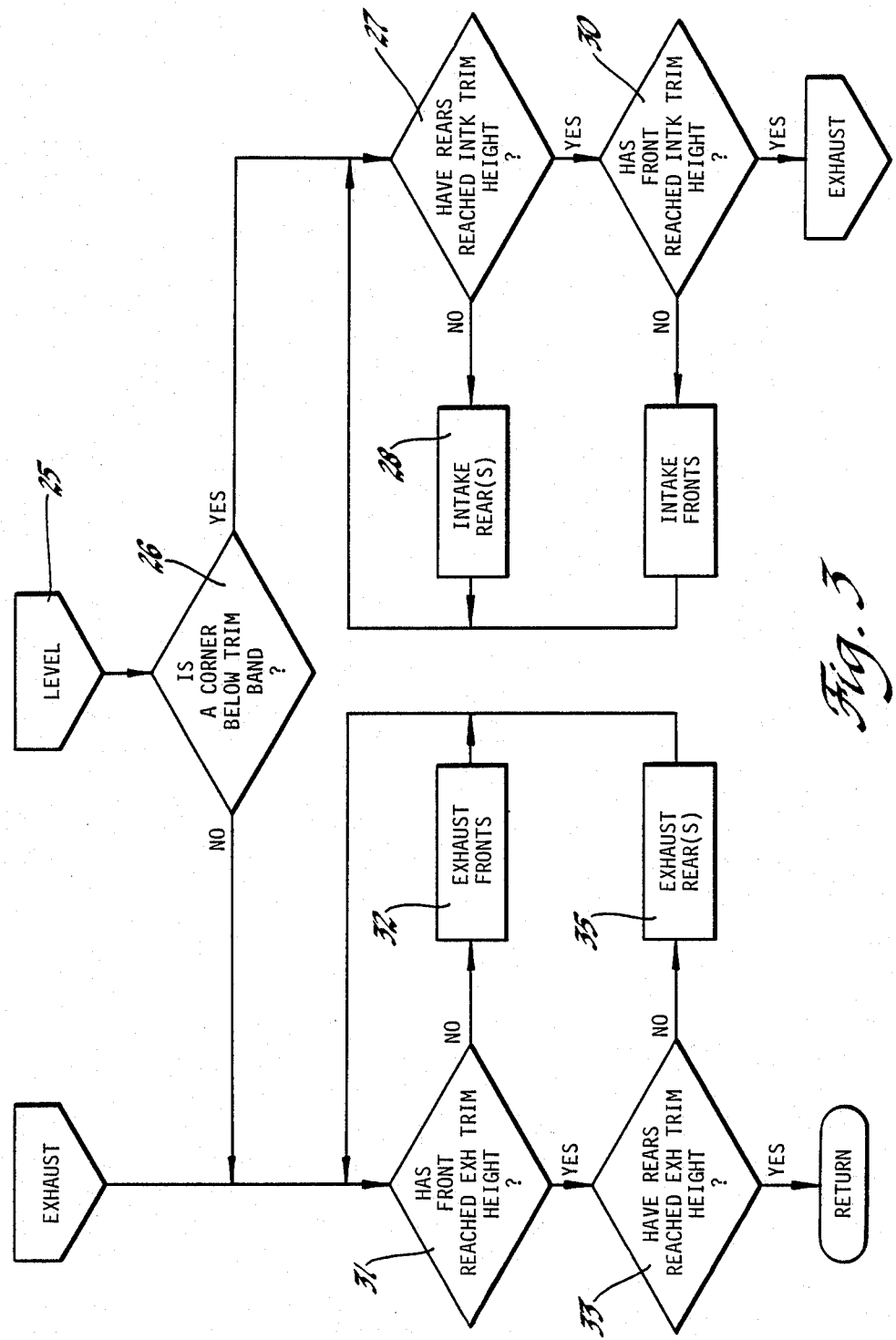
FIG. 3 is a flow chart describing the basic leveling algorithm for the system of the invention when initiated by a sensed out of level condition.

The leveling control algorithm for the embodiment of FIG. 1 is shown in the flow chart of FIG. 3. It reaches the title block "LEVEL" if a corner is detected outside the upper or lower trim band. Once a corner is detected out of trim, all four corners will be sent to their target levels, which are the intake or exhaust trim points, depending on whether intake or exhaust is needed for that level. The order is intake before exhaust and, for either, front and rear in the order that prevents the rear from falling below the front. For either front or rear, if both sides need the same leveling activity (intake vs. exhaust), they are adjusted together.

From the title block, the program asks at decision point 26 if a corner is below the lower trim level. If the answer is yes the program asks at decision point 27 if the rear devices have reached the intake trim level. If not, intake action is initiated or continued for the rear devices in step 28; and the program returns to decision point 27. If the answer is yes, the program asks at decision point 30 if the front devices have reached the intake trim level. If not, intake action is initiated or continued with the front devices; and the program returns to decision point 27. If the answer is yes or if the answer is no at decision point 26, the program asks at decision point 31 if the front devices have reached the exhaust trim level. If not, the program initiates or continues exhaust for the device at step 32 and returns to decision point 31. If the answer is yes, the program asks at decision point 33 if the rear devices have reached exhaust trim level. If not, exhaust action is initiated or continued at the device; and the program returns to decision point 31. If the answer is yes, leveling is completed; and the program returns from the routine until the next time a corner is detected out of the dead band defined by the upper and lower trim levels.

Figure 4A:
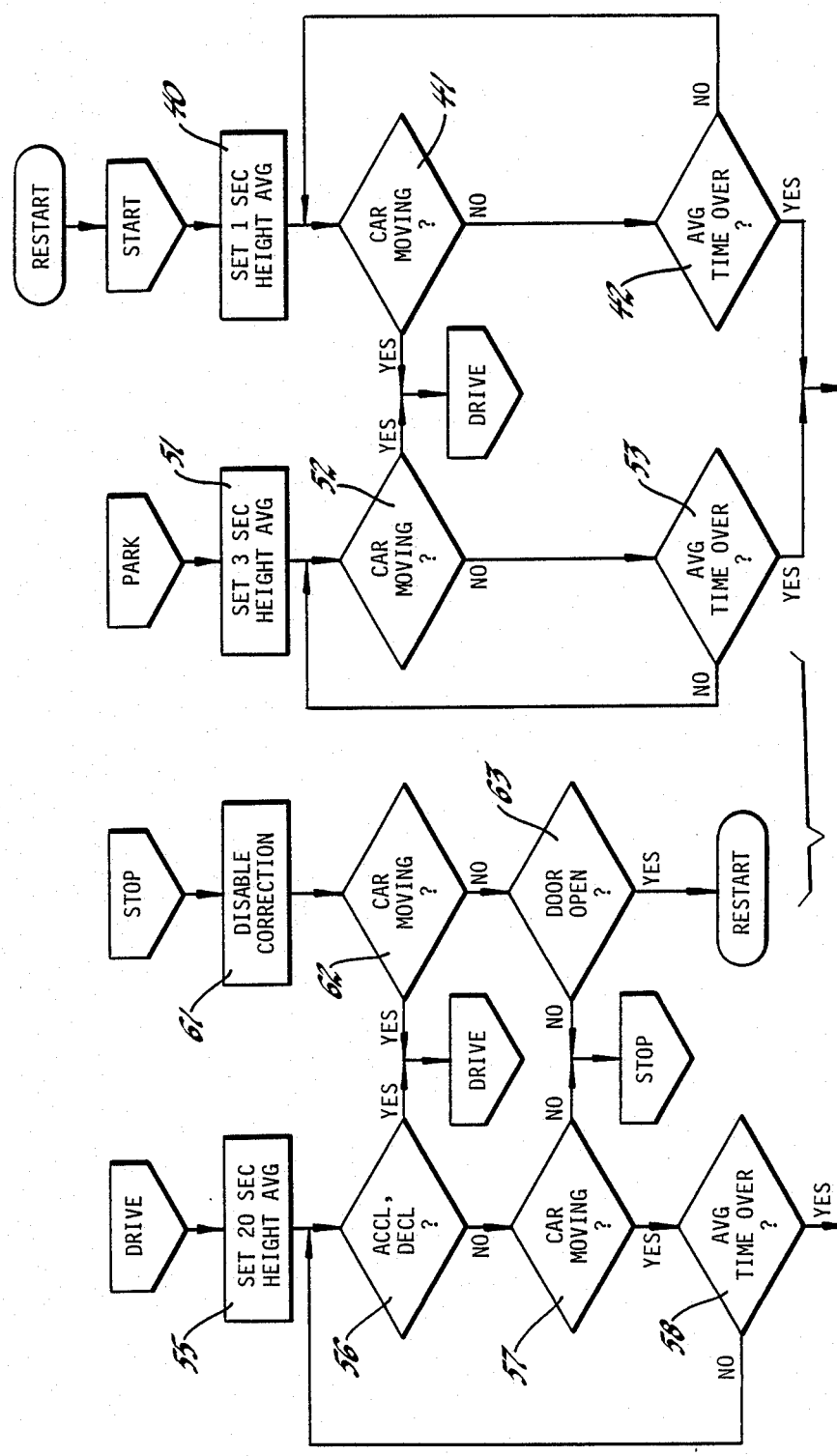
FIGS. 4a and 4b are is a flow charts describing the overall leveling operation initiation of the system shown in FIG. 1.
Figure 4B:
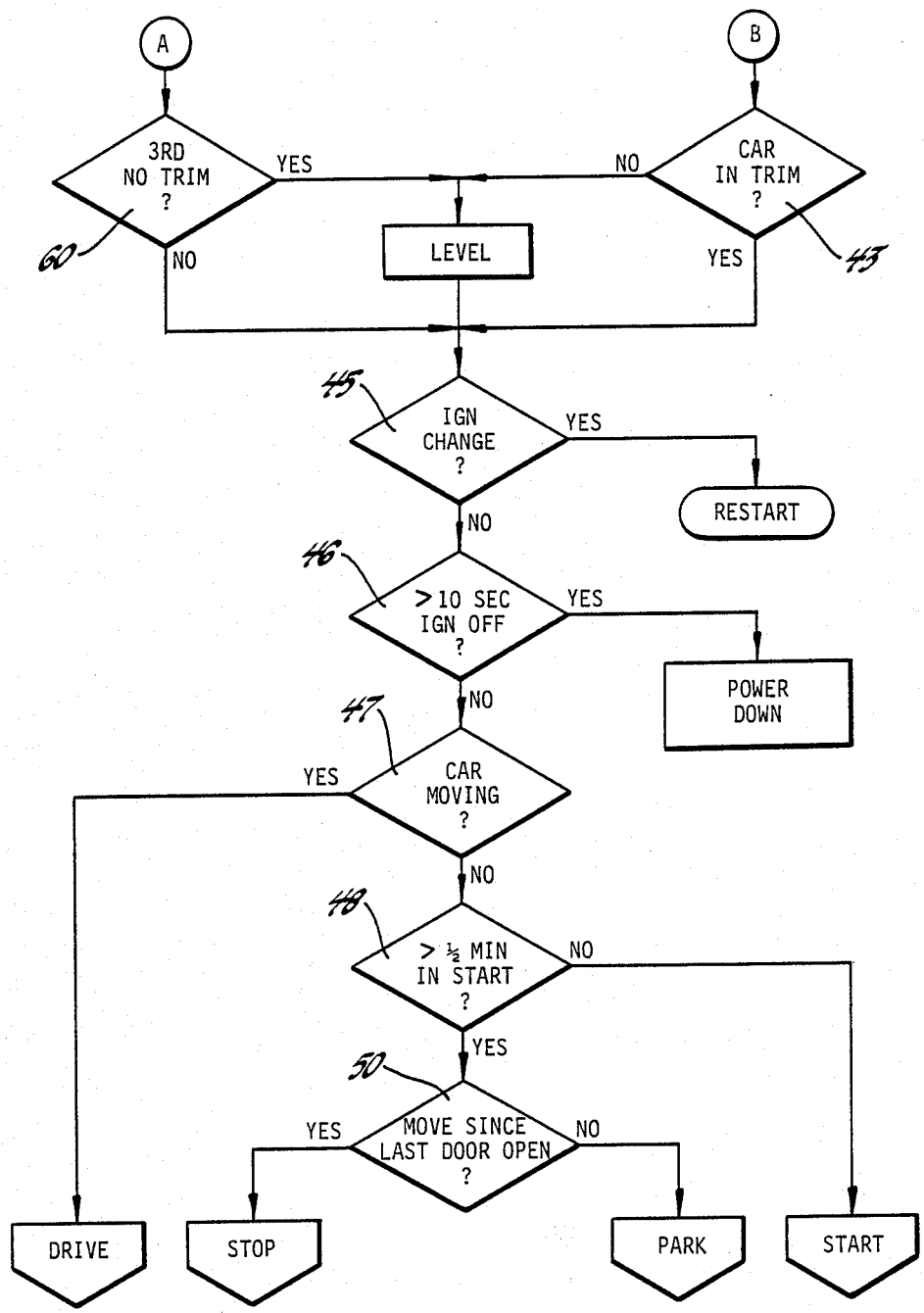

The overall level control, in which the necessity of leveling activity initiation is determined, is shown in the flow chart of FIG. 4. The system starts at the "RESTART" title block and enters the START mode. A short height averaging period of, for example, 1 second is selected at step 40. This height averaging period is a common transient eliminating feature of vehicle leveling systems. In this embodiment, the input samples from each sensor are processed in a software low pass filter routine with for a time corresponding to the averaging period. The short period is chosen for the start to get immediate leveling activity if required.

At decision point 41, the program asks if the car is moving, as determined by the vehicle speed signal SPD. If so, the program shifts to the DRIVE mode, yet to be described. If not, the program asks at decision point 42 if the average time is over. If it is not, the program returns to decision point 41. If it is, the program asks at decision point 43 if the car is in trim—that is, if no corners are out of trim. If not, the LEVEL routine described in FIG. 3 is performed. If so, however, this routine is skipped; and the program asks at decision point 45 if there has been a change in the ignition status as indicated by the IGN signal. If so, the program returns to RESTART. If not the program asks at decision point 46 if the IGN signal has indicated ignition off for more than 10 seconds. If so the program enters the POWER DOWN routine to turn off the system. This 10 second period allows some leveling action after the ignition is turned off. If not the program asks at decision point 47 if the car is moving. If so the program enters the DRIVE mode. If not the program asks at decision point 48 if it has been in the START mode for more than 30 seconds. If not, the program re-enters the START mode for another 1 second averaging period. If so, however, the program asks at decision point 50 if the car has moved since the last door was opened, as indicated by the SPD signal and door sensors. If not the program enters the PARK mode. If so the program enters the STOP mode.

The PARK mode begins by setting the height averaging period to 3 seconds at step 51, although it could be set to another short time or eliminated, if desired, in favor of the START mode. The program next asks at decision point 52 if the car is moving. If so, the program enters the DRIVE mode. If not, the program asks at decision point 53 if the averaging time (3 seconds) is over. If not, the program returns to decision point 52. If so, the program proceeds to decision point 43, already described.

The DRIVE mode begins by setting the averaging period to 20 seconds at step 55. Next, the program asks at decision point 56 if the car is accelerating or decelerating. If so the program re-enters the DRIVE mode to start new 20 second averaging period, since the acceleration probably took one or more sensors out of the dead band but no leveling activity is desired for a transient vehicle maneuver. If not the program asks at decision point 57 if the car is moving. If not, the program enters the STOP mode. If so, the program asks at decision point 58 if the average time is over. If not the program returns to decision point 56. If so the program asks at decision point 60 if there have been 3 consecutive 20 second averaging periods with a corner out of the dead band. If so, the LEVEL routine of FIG. 3 is called. If not the program proceeds to decision point 45, already described.

The STOP mode begins by disabling correction at step 61. The program next asks at decision point 62 if the car is moving. If so the program enters the DRIVE mode. If not the program asks at decision point 63 if a door is open as indicated by the door sensors. If not the STOP mode is re-entered. If so the program returns to RESTART. The STOP mode is thus entered only when the vehicle is not moving but has moved since the last time a door was opened. As soon as a door opens, the program leaves the STOP mode, since leveling activity is anticipated.

There are several possible features of the system which are not shown in the flow charts. The system may be programmed to change the target levels, either automatically in response to vehicle speed SPD or by operator switch to lower the vehicle body for better handling and/or fuel economy at high speeds. The lowering may be identical for all four corners or may be greater in front for a streamlined "rake". Similarly, the target levels may be raised in response to an operator switch, at least below a predetermined vehicle speed, for greater clearance in off road operation. In addition, because of the accurate side to side leveling of the system, when the car is moving a difference between the levels of the sides may be used as an indication of a turn to prevent leveling. This gives a good indication of a vehicle turn without the need for an additional sensor.

The embodiments of the invention in which an exclusive property of privilege is claimed are defined as follows:

1. A suspension system for a vehicle having a sprung mass supported relative to road wheels by pressure fluid activated leveling devices, including at least one such leveling device on each side of the vehicle activatable to vary the level of the sprung mass of the vehicle adjacent the associated road wheel, the suspension system further comprising a level sensor for each of said leveling devices and control apparatus as follows:

intake means responsive to a low signal from each of the level sensors to provide increased pressure fluid to the associated leveling device to raise the level of the sprung mass adjacent the associated road wheel;

exhaust means responsive to a high signal from each of the level sensors to provide decreased pressure fluid to the associated leveling device to lower the level of the sprung mass adjacent the associated road wheel;

control means effective to control the response of the intake and exhaust means to the signals from the level sensors to initiate leveling activity in closed loop operation for each of said leveling devices as required to a target level when one of said level sensors indicates that the level of the sprung mass of the associated road wheel is outside a dead band and discontinue leveling activity when said one of said level sensors has indicated that the target level has even reached;

first memory means in the control means for each of said leveling devices for storing a calibrated level, an upper trim level above the calibrated level and a lower trim level below the calibrated level for that leveling device, the upper and lower trim levels defining the dead band therebetween, the calibrated level corresponding to an actual desired level and being substantially midway between the upper and lower trim levels; and second memory means in the control means for each of said leveling devices for storing an intake trim level between the calibrated level and the upper trim level and an exhaust trim level between the intake trim level and the upper trim level, the control means being effective to use the intake trim level as the target level for intake leveling activity and the exhaust trim level as the target level for exhaust leveling activity, the intake and exhaust trim levels being set to provide for overshoot during intake and exhaust, respectively, to a common intermediate level therebetween, the common intermediate level being set above the calibrated level to provide for settling to the calibrated level after leveling activity is discontinued, whereby accurate side to side leveling is attained.

2. The suspension system of claim 1 in which the system comprises four leveling devices, one on each side near the front of the vehicle and one on each side near the rear of the vehicle, and the control means further comprises means for determining the order of leveling activity with intake leveling activity before exhaust leveling activity, with rear intake leveling activity initiated before front intake leveling activity and with front exhaust leveling activity initiated before rear exhaust leveling activity, whereby the rear of the vehicle does not fall below the front of the vehicle during leveling.

3. The suspension system of claim 1 in which the control means further comprises means for preventing activation of the intake and exhaust means while the vehicle is not moving but has moved since the last opening of one or more selected vehicle doors.

* * * * *